United States Patent [19]

Decker

[11] 4,079,885
[45] Mar. 21, 1978

[54] APPARATUS AND METHOD OF UTILIZING WASTE HEAT FROM FURNACE COMBUSTION

[76] Inventor: J. William Decker, 76 Huff Ter., Upper Saddle River, N.J. 07458

[21] Appl. No.: 758,470

[22] Filed: Jan. 11, 1977

[51] Int. Cl.² .............................................. F24H 3/12
[52] U.S. Cl. .................................... 236/1 G; 236/10; 237/55
[58] Field of Search ................... 237/55; 236/1 G, 16, 236/10, 9; 126/285 B; 110/162

[56] References Cited

U.S. PATENT DOCUMENTS

| | | | |
|---|---|---|---|
| 1,979,462 | 11/1934 | Gardner et al. | 110/75 |
| 3,010,451 | 11/1961 | Hodgins | 236/1 G |
| 3,944,136 | 3/1976 | Huie | 237/55 |

*Primary Examiner*—William E. Wayner
*Attorney, Agent, or Firm*—Ralph R. Roberts

[57] ABSTRACT

This invention pertains to apparatus and a method for utilizing waste heat as produced in furnaces, particularly boilers. This apparatus and method is equally useful in hot air furnaces. After heating the water or air the heat that passes into the plenum is caused to pass over and around a heat exchanger which moves air by a blower means through this exchanger into the house or basement. This air can be humidified, if desired. The exhaust stack during the combustion period is open to the chimney. At other times it is closed to prevent heat escape from the boiler. A collecting means is provided for moisture that may collect on the heat exchanger.

11 Claims, 2 Drawing Figures

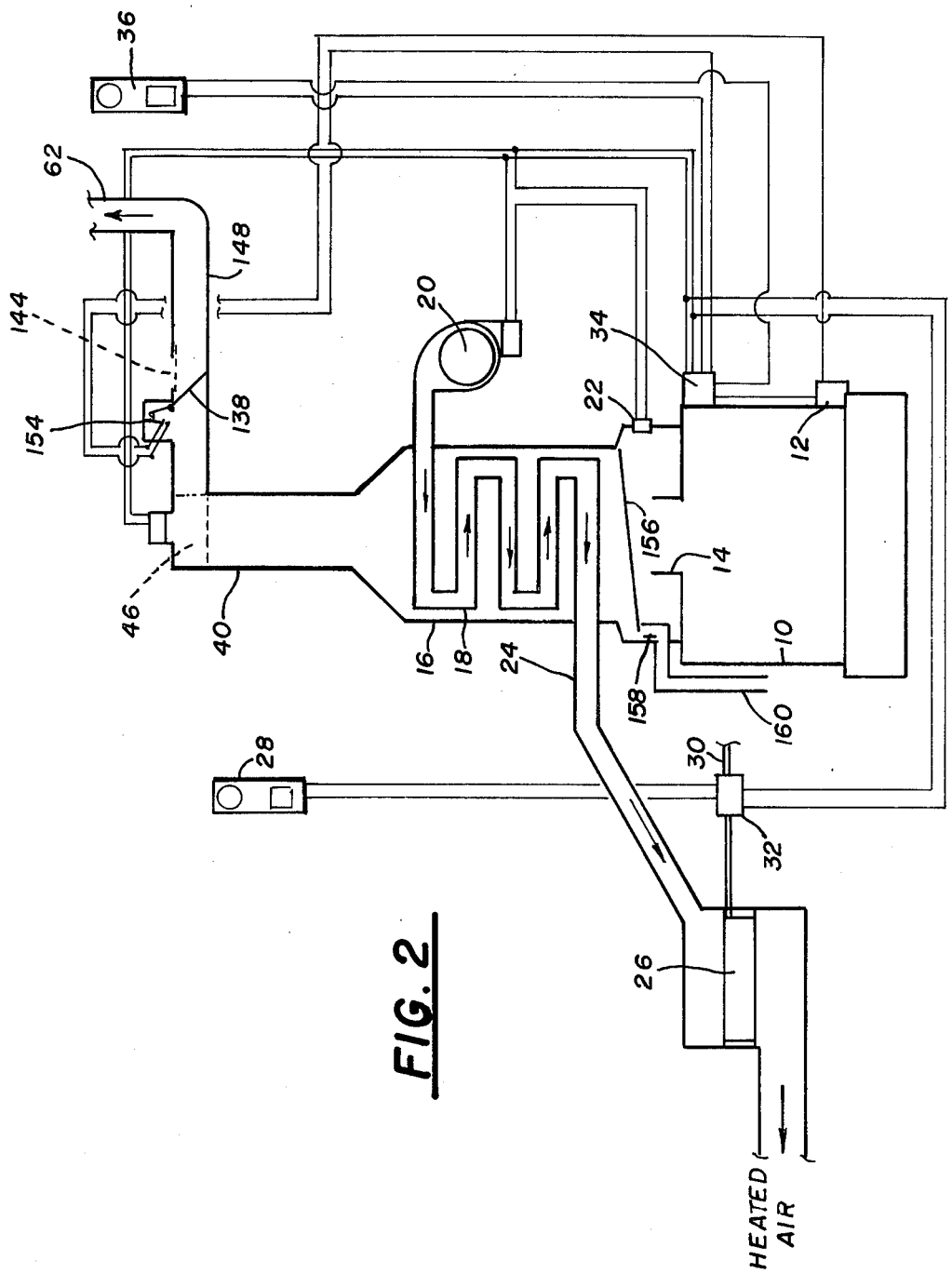

APPARATUS AND METHOD OF UTILIZING WASTE HEAT FROM FURNACE COMBUSTION

BACKGROUND OF THE INVENTION

1. Field of the Invention

With reference to the classification of art as established in the United States Patent and Trademark Office the present invention is found in the general Class entitled, "Furnaces" (Class 110) and in the subclass entitled, "from exhaust" (subclass 162).

Also of interest is art found in the general Class entitled, "Heating Systems" (Class 237) and the subclass entitled, "air-flue heated" (subclass 55).

DESCRIPTION OF THE PRIOR ART

Low pressure boilers and hot air furnaces used particularly for home heating are well known and widely used. The heating of the boiler section in a typical furnace results in the loss of a substantial portion of the heat produced. In hot air heat a like loss occurs. This loss occurs in the heat that is not used and passes up the chimney. The present invention is directed toward using this waste heat to pass around a heat exchanger which is contemplated to reduce the stack effluent gases to one hundred and twenty degrees or less. To increase the efficiency of the heat exchange unit and also to insure that the gases resulting from combustion are expelled up the chimney an auxiliary blower is employed.

Many patents have issued on apparatus as used in furnaces for home and like installations. Of interest and note is U.S. Pat. No. 1,892,188 to GOODRIDGE as issued on Dec. 27th, 1932 and also U.S. Pat. No. 2,281,163 to PAGET as issued on Apr. 28th, 1942. These patents show heat exchangers as used with furnaces. Automatic stack or damper apparatus is shown in U.S. Pat. No. 3,363,460 to JOHNSON, etal. as issued on Nov. 11th, 1941. Also in this same context is U.S. Pat. No. 2,620,984 to LARSEN as issued on Dec. 9th, 1952 and U.S. Pat. No. 3,228,605 as issued to DIERMAYER, etal. on Jan. 11th, 1966. Forced expelling of combustion products is seen in U.S. Pat. No. 3,280,774 to ENGLISH as issued on Oct. 25th, 1966. This is also seen in U.S. Pat. No. 3,587,490 as issued to MARTIN on June 28th, 1971 and in U.S. Pat. No. 3,944,136 as issued to HUIE on Mar. 16th, 1976. Fluid collection from condensers is shown in U.S. Pat. No. 3,057,602 as issued to STOKER, etal. on Oct. 9th, 1962.

Although many patents have been broadly directed toward the intent of the present invention, it is believed that the simple heat recovery system, hereinafter to be more completely described, presents an economical method of efficiently using the heat that usually is directed up the chimney. In the present apparatus the heat exchanger reduces the amount of heat as delivered to the plenum and also collects any resulting condensation as well as opens the chimney to force the cooled gas up this chimney. This occurs only when combustion is present. The present apparatus opens a vent to the chimney from the cellar or furnace room when the plenum is cool.

In brief, two embodiments of furnace installations are shown as applied to utilizing waste heat as it passes into the plenum of a heating chamber. In a furnace, either a boiler for hot water, low pressure steam or a hot air apparatus, there is placed a heat exchanger in which air from a basement or furnace room is drawn by a blower or fan and fed to and through this heat exchanger coil and to a hot air supply duct. This air in the exchanger is heated in the plenum and by the heated gases passing from the fire box to the chimney. A forced draft is provided in the chimney. This draft is actuated when heat from the furnace is called for by the thermostat. A collector for the condensate accumulation from the heat exchanger removes this condensate. A thermostat in the plenum senses when the heat exchanger is to be actuated and shut off.

SUMMARY OF THE INVENTION

This invention may be summarized at least in part with reference to its objects.

It is an object of this invention to provide a heat recovery system in which a heat exchange unit is placed in the plenum of the furnace. The chimney is closed except just before and during combustion when a blower forces the flow of gas up the chimney. During the combustion period when the temperature of the plenum has risen to a determined level, a thermostat activates a blower to move air through the heat exchanger. This exchanger reduces the plenum temperature and moves this heat to parts of the building to be heated.

There are two embodiments to be shown and more fully described hereinafter. In brief, this invention contemplates a conventional furnace particularly for a dwelling. In this furnace hot air, hot water or low pressure steam may be produced. Waste or heat that passes into this plenum or bonnet after doing its initial job is passed over and around a heat exchanger. The heat exchanger uses this heat to warm air passed through the exchanger and then into a living area. The flue has a forced exhaust to accommodate the cooled stack of gases.

Controls for humidity, temperature, plenum closure and flue exhaust are shown and contemplated. The furnace is intended to operate in a normal manner and to efficiently utilize the escaping heat to heat air passing through a heat exchanger. The stack door and flue exhaust must be actuated to the desired orientation if combustion is to be initiated and to proceed. A thermostat senses the temperature in the plenum and only and while the temperature in the plenum is at or above this set temperature is the blower moving air through this heat exchanger.

In addition to the above summary the following disclosure is detailed to insure adequacy and aid in understanding of the invention. This disclosure, however, is not intended to cover each new inventive concept therein no matter how it may later be disguised by variations in form or additions of further improvements. For this reason there has been chosen two embodiments of the furnace apparatus as adopted for utilizing waste heat and showing the preferred means for installing and automatically controlling the flow of waste gas. These specific embodiments have been chosen for the purposes of illustration and description as shown in the accompanying drawings wherein:

BRIEF DESCRIPTION OF THE DRAWINGS

FIG. 2 represents a schematic representation of a furnace and associated apparatus much like that in FIG. 1 but with a simplified forced draft control of the exhaust gases.

In the following description and in the claims various details are identified by specific names for convenience. These names, however, are intended to be generic in their application. Corresponding reference characters refer to like members throughout the two figures of the drawings.

Figure 1:
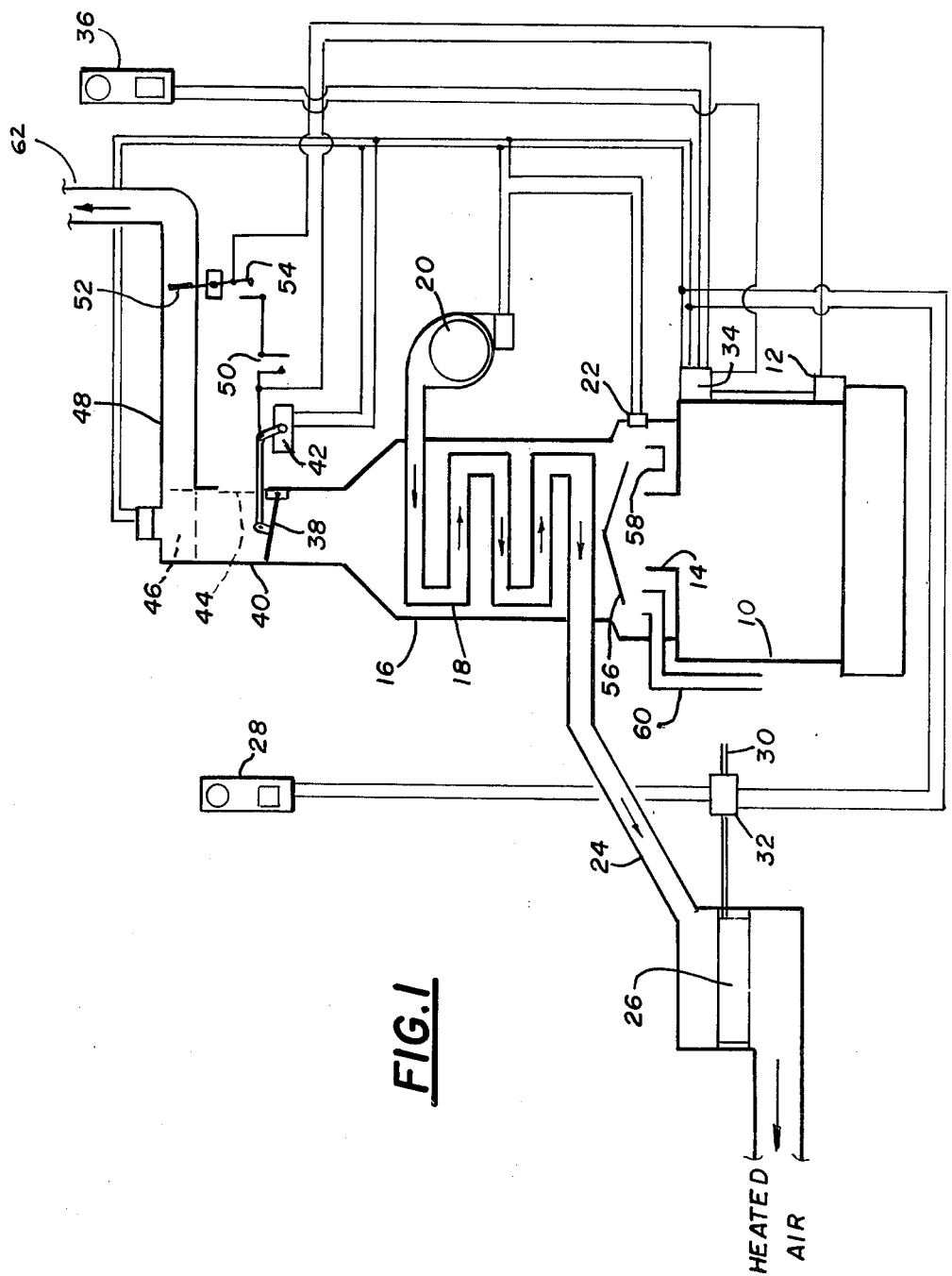
FIG. 1 represents a schematic representation of a furnace in which an air flow door is operably connected to a temperature demand thermostat, this furnace having a heat exchanger in its plenum area and any condensate therefrom collecting below the heat exchanger.

The drawings accompanying, and forming part of, this specification disclose certain details of construction for the purpose of explanation of the broader aspects of the invention, but it should be understood that structural details may be modified without departure from the concept of the invention and that the invention may be incorporated in other structural forms than shown.

DESCRIPTION OF THE EMBODIMENT OF FIG. 1

Referring next to the drawings and in particular to FIG. 1, there is shown a furnace having a firebox portion generally indicated as 10. A valve 12, when opened, admits oil or gas for the purpose of combustion heating of the furnace. The ignition is conventional and the furnace may be a hot air, hot water or steam arrangement. The hot combustion gases pass from the firebox portion 10 through an outlet 14 into a plenum area 16. In this plenum is positioned a heat exchanger 18 in the form of a serpentine apparatus. A blower 20 is connected to and supplies air drawn from the basement furnace room or a cold air return. This blower is only actuated when a thermostat 22 senses that heated air is present in the plenum.

If the furnace is hot air, the thermostat may sense a temperature level of as little as one hundred fifty degrees Farenheit. When the furnace is of the hot water type or the steam type, the thermostat 22 is actuated at an appreciably higher level. It is to be noted that the heat exchanger 18 is arranged to bring the cooler supplied air in at the top of the plenum and the heated air is discharged at the lower portion thereof. This heated air is carried by conductor 24 to the living area of the house. A humidifier 26 may be placed in this conductor 24 to condition the heated air. A control of this humidifier is provided by a humidistat 28 which may be positioned in the living area. A water supply 30 is released to the humidifier through a humidifier control 32 actuated in response of a signal from the humidistat 28 and a signal from a furnace control box 34. This signal producing circuit is conventional.

In addition to the power supply there is also a signal from a thermostat 36 which sends a signal to the control box 34 when heat is indicated as needed by the setting of the thermostat 36. When a signal is received indicating heat is to be supplied, the burner valve 12 is opened for burner firing. Just prior to ignition a signal from control box 34 causes air flow door 38 to be moved from a position whereby it closes the bonnet 40 to prevent cooling of the furnace when the furnace is off. A signal from control box 34 is sent to an actuator 42 which moves the door to open the bonnet 40 and close opening 44. A low velocity blower 46 is also actuated at this time and moves any and all exhaust gases up flue 48. A sensing switch 50 is closed by actuator 42 and also is in signal communication with the furnace control box 34. An air flow sensor 52 in flue 48 closes switch 54 when blower 46 is open so that with switch 50 the burner valve cannot open until the air flow door is moved to close opening 44 and actuate the low velocity blower 46. A baffle 56 is disposed below the heat exchanger 18 to deflect and direct any condensate therefrom to collector 58 and then to drain 60. Pipe 62 connects flue 48 to the chimney, not shown. In a boiler for hot water or steam there is conventionally an aquistat or thermocouple that opens at a selected temperature. This prevents opening of the fuel supply valve 12 until the boiler has cooled to a certain level. In a hot air furnace a thermostat is connected to the valve 12 to insure that the fuel is not turned on until the furnace fire box area 10 has cooled below a certain temperature.

USE AND OPERATION

The furnace and its firebox 10 is conventional and is adapted for hot air, hot water or low pressure steam. In the plenum or bonnet portion a heat exchanger is placed and when a heat level sufficient to actuate thermostat 22 is achieved the blower 20 is started and heated air from its trip through the heat exchanger is delivered to the dwelling or living area. If humidity is to be added to this heated air the humidistat 28 opens control 32 to feed water from supply duct 30 to humidifier 26. Whether gas or oil fired, it is contemplated that opening 44 in the furnace is open until the low velocity blower 46 is actuated. A time delay sensor may be provided to ascertain that combustion indeed has occurred and heat is being produced after opening 44 is closed and blower 46 is actuated. If a failure does occur then a signal, not shown, is actuated to indicate the malfunction.

It is also to be noted that door 38 closes the bonnet or plenum outlet 40 during the period heat is not being produced. The blower 46 provides a forced exhaust up the chimney 48 only when the door 38 is moved to close opening 44. As and while the door 38 closes the outlet 40, the blower 46 is not actuated and opening 44 is open to allow venting of the furnace room or basement during the time the furnace is off. The heat exchanger 18 is only actuated when thermostat 22 produces a signal that sufficient heat is present. A signal from control box 34 to valve 12 to allow combustion is not sent unless door 38 covers opening 44 thus closing switch 50 and when blower 46 closes switch 54.

ALTERNATE CONSTRUCTION OF FIG. 2

Referring next and finally to FIG. 2, there is shown an alternate construction in which both the stack control and the condensate baffle in FIG. 1 have been changed. A baffle 156 collects and carries any condensate from the heat exchanger 18 through a collector 158 and from this collector the condensate is carried to a drain 160. Rather than air flow door 38, as shown in FIG. 1, the bonnet 40 terminates with a horizontal flue 148 in which a low velocity blower 46, as seen in FIG. 1, is actuated when the thermostat 36 sends a signal to the furnace control box 34. An air flow door 138 is disposed in this flue 148 and with blower 46 deactivated this door closes the flue to unwanted heat loss from the plenum 16. With the flue closed, as shown, and the blower 46 not moving exhaust gases up the flue, a venting of the furnace room or basement occurs through opening 144.

An actuator may assist in the movement of door 138 to close opening 144 when blower 46 is actuated. A switch 154 is closed when the door 138 is moved to a horizontal position to close opening 144 and open flue 148 to carry the gases of combustion to the outside.

Baffle 156 is a flat member in sloped attitude toward a collector 158 which carries any condensate to a discharge 160.

USE AND OPERATION OF APPARATUS OF FIG. 2

In operation, the firebox 10, valve 12, outlet 14, plenum 16, heat exchanger 18, blower 20, thermostat 22, conductor 24 and humidifier 26 operate as above-described. Also humidistat 28, water supply 30, control 32, furnace control 34 and thermostat 36 operate in the manner, above-described. The bonnet 40 is not closed by door 38 and the opening 44, actuator 42 and switch 50 is not present in FIG. 2. The low velocity blower 46, when actuated, moves the cooled gases along stack 148 and up pipe 62 to the chimney.

The use and operation of the apparatus of FIG. 2 is like that of FIG. 1 except that heat loss to the chimney is prevented by door 138 which is in flue 148 and closes opening 144 when blower 46 is actuated. This alternate construction eliminates the need of door 38, actuator 42 and the sensor 52. Instead in FIG. 2, an air flow door 138 closes flue 144 except when blower 46 is actuated and the door closes vent 144. The baffle 156 in FIG. 2 shows a simple planar sheet tilted or sloped to carry the condensate to collector 158 and drain 160. In all other respects the apparatus is like the apparatus of FIG. 1. The control circuit for the thermostat, the furnace control and all other signalling circuits are conventionally of a low voltage. A ground wire or coaxial cable can be used. Such circuits are well known and no patentable distinction thereto is claimed. Blower 20 operates whenever and while the thermostat 22 is closed by the presence of a desired level of heat in the plenum 16. Blower 46 and air flow door 38 or 138 are actuated and moved to open the stack 62 before valve 12 is opened.

AS A METHOD

Both FIG. 1 and FIG. 2 suggest a method for utilizing escaped or waste heat to increase the efficiency of a furnace as particularly adapted for dwellings using hot air, hot water and low pressure steam. Whether gas or oil, the produced heat is not all converted in present apparatus and this invention shows a method of utilizing such heat in a plenum of a furnace by heating the air as passed through a heat exchanger and with the air emerging from this exchanger as heated air assisting and supplementing the heating of the living area served by the furnace, said method including the steps of providing a firebox and burner of conventional construction and function in which the burner is controlled by opening and closing a valve, the opening of said valve producing a combustion; forming a plenum area above the furnace firebox and above the conventional area for the boiler, hot water heat exchanger, hot air exchanger and the like; mounting a heat exchanger in said above plenum area and supplying the inlet of this exchanger with room air from the basement, furnace room and the like and in which the furnace is positioned, and moving this room air by a blower which moves this air through the exchanger where it is heated and delivered to a living area of the dwelling being supplied heat by the furnace; positioning and providing a thermostat at the bottom of the plenum area containing the heat exchanger and making this thermostat responsive to the determined level of heat in said plenum so that when this level is reached the blower serving the heat exchanger is actuated and when the heat level has dropped below that established by said thermostat the blower is deactivated; providing a low velocity blower disposed to move that gas produced by combustion after passing through the plenum, this gas moved by the blower to and through a flue and to a chimney leading to the outer air; forming and providing a vent in association with said low velocity blower, this vent open to the area in which the furnace is located, this vent closed by a selectively movable door actuated into vent closing condition when the low velocity blower is actuated and into vent open condition when the blower is deactivated, the movement of the door opening the vent and permitting air from the furnace area to flow to and through the chimney and while the vent is open this moved door closes the firebox to a flow of heat, gas and the like during absence of combustion and providing a thermostat means disposed in the living area and adapted to send a signal to a furnace control box means for producing a combustion when heat is desired and indicated by said thermostat means, the products of combustion passing from the firebox to and by the conventional heating area and to and around the heat exchanger to warm the air therein as moved through this exchanger by a blower and with a low velocity blower moving this now cooled gas passed a closed vent and to and out a connected chimney.

Terms such as "left", "right", "up", "down", "bottom", "top", "front", "back", "in", "out" and the like are applicable to the embodiments shown and described in conjunction with the two figures. These terms are merely for the purposes of description and do not necessarily apply to the position in which the apparatus may be constructed or used.

While particular embodiments of the apparatus as applied to small conventional furnaces have been shown and described it is to be understood the invention is not limited thereto since modifications may be made within the scope of the accompanying claims and protection is sought to the broadest extent the prior art allows.

What is claimed is:

1. Apparatus for utilizing the heat in a plenum of a furnace by passing air through a heat exchanger and emerging from this exchanger as heated air which assists in the heating of the living area served by a furnace, said apparatus including: (a) a firebox and burner of conventional construction and function in which the burner is controlled by opening and closing a valve, the opening of said valve producing a combustion in cooperation and combination with conventional ignition means; (b) a plenum area provided above the furnace firebox and above the conventional area for the boiler, hot water heat exchanger, hot air exchanger and the like; (c) a heat exchanger mounted in said above plenum area, the inlet of this exchanger being supplied by room air from the basement, furnace room and the like, the air in this exchanger being moved by a blower through the exchanger where it is heated and after being heated delivered to a living area of the dwelling being supplied by the furnace; (d) a thermostat provided at the bottom of the plenum area containing the heat exchanger, this treatment responsive to the determined level of heat in said plenum so that when the heat above this level is reached the thermostat controlling the blower serving the heat exchanger is closed and the blower is actuated and when the heat level has dropped below that established by said thermostat the blower is deactivated; (e) a low velocity blower disposed to move that gas produced by combustion after passing through the plenum, this gas moved by the blower to and through a flue and to a chimney leading to the outer air; (f) a vent in association with said low velocity blower, this vent open to the area in which the furnace is located, this vent closed by a selectively movable door actuated into vent closing condition when the low velocity blower is actuated and into vent open condition when the low velocity blower is deactivated, the movement of the door opening the vent and permitting air from the furnace area to flow to and through the chimney and while the vent is open this moved door closes the firebox to a flow of heat, gas and the like during absence of combustion, and (g) thermostat means disposed in the living area and adapted to send a signal to a furnace control box means for producing a combustion when heat is desired and indicated by said thermostat means, the low velocity blower being actuated and the vent being closed before the signal from the living area thermostat means actuates a combustion, the products of combustion passing from the firebox to and by the conventional heating area and to and around the heat exchanger to warm the air as moved through this exchanger by a blower and with a low velocity blower moving this now cooled gas past a closed vent and to and out a connected chimney.

2. An apparatus for utilizing escaped heat as in claim 1 in which there is provided in the plenum area a condensate collector positioned below the heat exchanger and a discharge means for carrying any resulting condensate from the interior of the furnace to the exterior of the furnace.

3. An apparatus for utilizing escaped heat as in claim 2 in which the condensate collector includes a conical baffle and a circular channel member in close proximity to the outer edges of the baffle, this channel member adapted to collect the run-off from the baffle and carry this condensate to and through a drain from the furnace.

4. An apparatus for utilizing escaped heat as in claim 2 in which the condensate collector includes a plate disposed below the heat exchanger and tilted toward one side of the furnace from whence the accumulated condensate is carried to and through a drain to the outside of the furnace.

5. An apparatus for utilizing escaped heat as in claim 1 in which the heat exchanger is serpentine in form and has the inlet portion thereof further from the firebox than the outlet portion which is nearer the firebox.

6. An apparatus for utilizing escaped heat as in claim 1 in which the vent is positioned at the top of the plenum and the movable door is secured to an actuator and is movable to close the plenum when the low pressure blower is deactivated, the movement of this actuator opening a switch which is further in series communication with a switch actuated by an air flow actuator disposed in a flue by and through which the exhaust gases are conducted, this flue actuated switch closed when air flow in the flue is developed by an activated low pressure blower.

7. An apparatus for utilizing escaped heat as in claim 1 in which the vent is formed in a flue portion and the selectively movable door is disposed to be moved by the velocity of the air provided by the low velocity blower and as the vent is closed by this door a switch in series with the burner valve is closed so that combustion cannot be achieved except and when said vent is closed and the low velocity blower is actuated.

8. An apparatus for utilizing escaped heat as in claim 1 in which the heated air from the heat exchanger is in flow communication with a humidifier which is actuated to humidify the heated air by and with a signal from a humidistat in the living area served by the furnace.

9. A method for utilizing the heat in a plenum of a furnace by heating the air as passed through a heat exchanger and with the air emerging from this exchanger as heated air assisting and supplementing the heating of the living area served by the furnace, said method including the steps of: (a) providing a firebox and burner of conventional construction and function in which the burner is controlled by opening and closing a valve, the opening of said valve producing a combustion in cooperation and combination with conventional ignition means; (b) forming a plenum area above the furnace firebox and above the conventional area for the boiler, hot water heat exchanger, hot air exchanger and the like; (c) mounting a heat exchanger in said above plenum area and supplying the inlet of this exchanger with room air from the basement, furnace room and the like and in which the furnace is positioned and moving this room air by a blower which moves this air through the exchanger where it is heated and delivered to a living area of the dwelling being supplied heat by the furnace; (d) positioning and providing a thermostat at the bottom of the plenum area containing the heat exchanger and making this thermostat responsive to the determined level of heat in said plenum so that when the heat above this level is reached the thermostat controlling the blower serving the heat exchanger is closed and the blower is actuated, and when the heat level has dropped below that established by said thermostat the blower is deactivated; (e) providing a low velocity blower disposed to move that gas produced by combustion after passing through the plenum, this gas moved by the blower to and through a flue and to a chimney leading to the outer air; (f) forming and providing a vent in association with said low velocity blower, this vent open to the area in which the furnace is located, this vent closed by a selectively movable door actuated into vent closing condition when the low velocity blower is actuated and into vent open condition when the low velocity blower is deactivated, the movement of the door opening the vent and permitting air from the furnace area to flow to and through the chimney and while the vent is open this moved door closes the firebox to a flow of heat, gas and the like during absence of combustion, and (g) providing thermostat means disposed in the living area and adapted to send a signal to a furnace control box means for producing a combustion when heat is desired and indicated by said thermostat means, the low velocity blower being actuated and the vent being closed before the signal from the living area thermostat means actuated a combustion, the products of combustion passing from the firebox to and by the conventional heating area and to and around the heat exchanger to warm the air therein as moved through this exchanger by a blower and with a low velocity blower moving this now cooled gas past a closed vent and to and out a connected chimney.

10. A method for utilizing escaped heat as in claim 9 in which there is provided the additional step of positioning in the plenum area a condensate collector below the heat exchanger and forming a discharge means for carrying the condensate from the heat exchanger from the interior of the furnace to the exterior of the furnace.

11. A method for utilizing escaped heat as in claim 9 which further includes the step of forming the heat exchanger to have a serpentine array with the inlet portion thereof further from the firebox than the outlet portion which is nearer the firebox.

* * * * *